(12) United States Patent
Tanaka et al.

(10) Patent No.: US 6,534,213 B1
(45) Date of Patent: Mar. 18, 2003

(54) BATTERY MODULE FOR COMPACT ELECTRIC APPLIANCE FOR COPING WITH DEFORMATION OF THE BATTERY

(75) Inventors: Masatoshi Tanaka, Kyoto (JP); Takashi Takeuchi, Fujisawa (JP)

(73) Assignee: Hitachi Maxell, Ltd., Osaka (JP)

( * ) Notice: Subject to any disclaimer, the term of this patent is extended or adjusted under 35 U.S.C. 154(b) by 0 days.

(21) Appl. No.: 09/647,719

(22) PCT Filed: Mar. 29, 2000

(86) PCT No.: PCT/JP00/01942

§ 371 (c)(1),
(2), (4) Date: Oct. 4, 2000

(87) PCT Pub. No.: WO00/59053

PCT Pub. Date: Oct. 5, 2000

(30) Foreign Application Priority Data

Mar. 29, 1999 (JP) ................................. 11-85172

(51) Int. Cl.⁷ ................................................ H01M 2/10
(52) U.S. Cl. ....................................................... 429/100
(58) Field of Search .................................. 429/96–100

(56) References Cited

U.S. PATENT DOCUMENTS 4,620,111 A * 10/1986 McArthur et al. .......... 307/150
5,942,352 A * 8/1999 Neil et al. .................. 429/163

FOREIGN PATENT DOCUMENTS

| EP | 1033766 A1 | * | 9/2000 |
| JP | 08236089 | | 9/1996 |
| JP | 10-340710 A | * | 12/1998 |
| JP | 2000-11975 A | * | 1/2000 |
| JP | 2000017364 | | 1/2000 |
| JP | 2000021368 | | 1/2000 |
| WO | WO-00/16416 | * | 3/2000 |

* cited by examiner

*Primary Examiner*—Patrick Ryan
*Assistant Examiner*—Susy Tsang-Foster
(74) *Attorney, Agent, or Firm*—Birch, Stewart, Kolasch & Birch, LLP

(57) ABSTRACT

A battery module adapted to be replaceably mounted on a mobile phone and capable of forming a part of an outer peripheral surface of the mobile phone. Deformation of the battery relative to a direction of contact of the battery module with the compact electric appliance is accommodated in a gap, defined in an inner surface of a container. In a direction away from the mobile phone, deformation of the container resulting from the deformation of the battery is allowed.

9 Claims, 5 Drawing Sheets

BATTERY MODULE FOR COMPACT ELECTRIC APPLIANCE FOR COPING WITH DEFORMATION OF THE BATTERY

This application is the national phase under 35 U.S.C. §371 of PCT International Application No. PCT/JP00/01942 which has an International filing date of Mar. 29, 2000, which designated the United States of America.

BACKGROUND OF THE INVENTION

1. Field of the Invention

The present invention relates to a battery module including a container with a battery therein, which container when replaceably mounted on a compact electric appliance such as, for example, a mobile phone, forms a part of an outer surface of the compact electric appliance.

2. Description of Background Art

In recent years, a relatively fierce competition is taking place among manufacturers to downsize battery-driven compact electric appliances including, for example, mobile phones as small as possible and, encased battery units used in those electric appliances as one of major components are not an exception. To cope with this trend, attempts have been made to downsize the encased battery unit by flattening the outer configuration of a battery and to render it to be lightweight by employing aluminum, in place of iron, as a material for a battery casing. Also, further reduction in size and weight is obviously possible that if the wall thickness of the battery casing for accommodating such a battery is reduced as small as possible to an extent necessitated and, at the same time, outer surfaces of a battery are held in tight contact with inner surfaces of the battery casing.

SUMMARY OF THE INVENTION

However, to sustain the battery power required in the compact electric appliance, the battery must have an adequate capacity. The mobile phone, for example, makes use of a generally rectangular flattened battery and any attempt to reduce the thickness of this type of battery requires increase of the area of front and rear surface areas of the battery, which necessarily leads to reduction in strength of a central region of each of the front and rear surface areas of the battery. It has been well known that although if a casing for the battery is made of iron, the battery can retain its shape by the effect of rigidity of the iron material, the use of aluminum as a material for the casing will result in insufficient rigidity for a given thickness, resulting in the possibility that the front and rear surface areas of the battery will be distended during the cycle of charging and discharging.

In most mobile phones, a battery providing a power source is employed in the form of a battery module including a container accommodating therein at least one battery or cell. In such case, to eliminate the above discussed problems, the rigidity may be increased by the use of the container having an increased wall thickness and/or a space, may be provided between the inner surface of the container and the surface of the battery or cell to accommodate expansion of the front and rear surface areas of the battery, thereby minimizing deformation of the battery module as a whole and also avoiding any possible adverse influence that may be brought on the compact electric appliance with which the battery module is used. However, these attempts are obviously contrary to the attempt to reduce the size and weight.

In an attempt to eliminate the numerous problems discussed above, the inventors of the present invention have conducted a series of studies on the interface between the compact electric appliance and the battery module. Deformation should be minimized in order for the interface between the compact electric appliance and the battery module to exhibit a sufficient strength with which they are engaged with each other. On the other hand, the inventors have found that since a casing for most of the compact electric appliances is formed to have a chamfered or rounded outer appearance, a slight swelling of the casing resulting from deformation of the battery or cell will not be noticeable. Speaking differently, the real problem does not lie in deformation of the battery module as a whole, and no adverse influence resulting from deformation of the battery or cell will be brought about only if means is provided to prevent any possible deformation from occurring at the interface with the compact electric appliance.

The present invention is therefore based on the foregoing finding and is intended to provide a battery module effective to prevent an undesirable mechanical bearing, brought about by deformation of the battery module, from being imposed on the compact electric appliance, while the size and the weight of the battery module as a whole are reduced as small as possible, for which while deformation of the container in the battery module in such a direction as to result in contact with the compact electric appliance is suppressed, the deformation of the battery or cell is guided outwardly of the compact electric appliance.

The battery module according to the present invention is of a design which when replaceably mounted on the compact electric appliance such as, for example, a mobile phone, forms a part of the outer surface of such compact electric appliance. This battery module includes a battery having a flattened outer configuration and tolerated to deform in a direction conforming to the direction of thickness thereof, and a container tightly enclosing the battery.

Also, deformation of the container in such a direction as to result in contact with the compact electric appliance when mounted on the compact electric appliance is suppressed, but deformation of the container in a direction opposite thereto and outwardly of the compact electric appliance is tolerated.

The battery module may be so constructed that deformation thereof in one of opposite directions across the thickness of the battery, that is, in a direction towards a casing of the compact electric appliance can be suppressed. In such case, suppression of the deformation of the battery can be achieved by selecting the rigidity of surfaces of the container that are tolerated to deform, to a value lower than that of surfaces thereof that are prohibited from deforming, or by forming a recess at a center region of the surfaces of the container that is suppressed from being deformed.

The container may be of a design capable of retaining peripheral edges of the battery and may have a gap between the battery and a contact surface thereof across the thickness of the battery for accommodating deformation of the battery, which gap may be defined. In such case, the space to be formed within the container may be formed by defining a recess in the center region of the surface thereof facing the battery, or by the thickness of a retaining member for connecting a periphery of the battery to the inner surface of the container.

Thus, according to the present invention, while the deformation of the container in the battery module in such a direction as to result in contact with the compact electric appliance is suppressed, deformation of the battery in a direction outwardly of the compact electric appliance is tolerated. Accordingly, it is possible to increase the reliability of the battery firmly retained in the battery module while. the size and the weight of the battery module as a whole can be reduced as small as possible and the capability of engagement with the compact electric appliance resulting from deformation of the battery module is maintained.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

In the following description, the present invention will be described as embodied in a battery module for use in a mobile phone. However, it is to be noted that the present invention may not be always limited to the mobile phone, but may be equally applied to the battery module for use in any compact electric appliance that is required to be reduced in size and weight.

Figure 1:
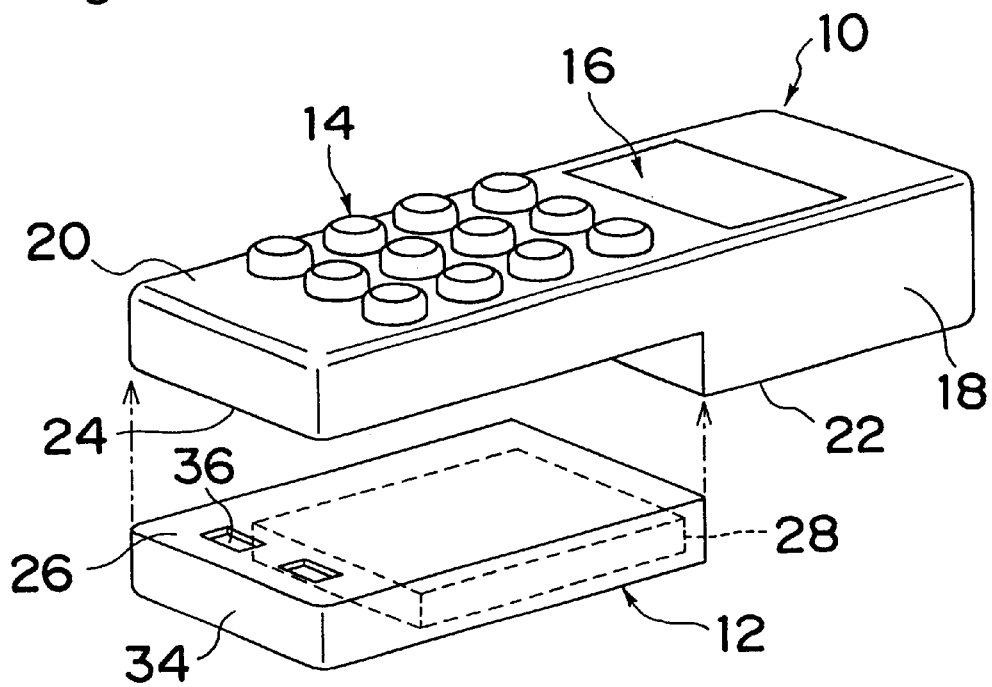
FIG. 1 is a schematic perspective view of a mobile phone embodying the present invention, with a battery module removed therefrom.
Figure 2:
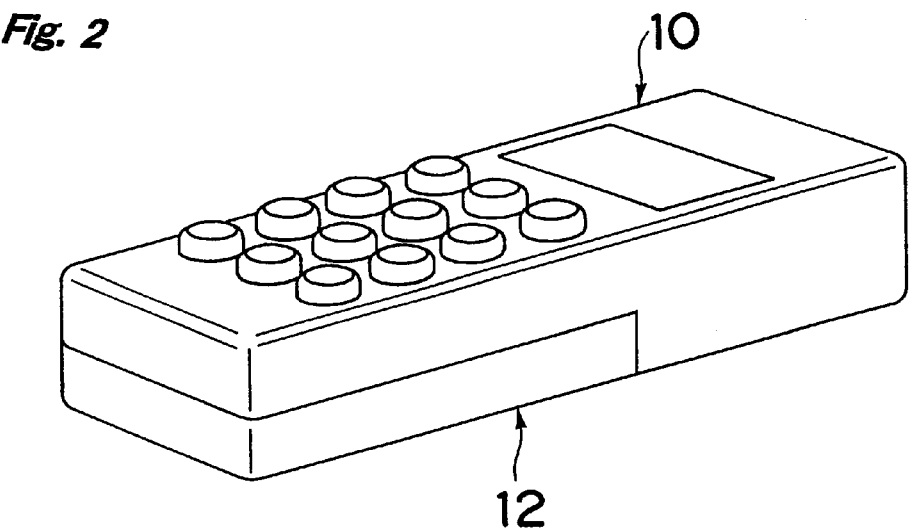
FIG. 2 is a schematic perspective view of the mobile phone shown in FIG. 1, with the battery module mounted thereto.

The mobile phone 10 includes, as shown in FIGS. 1 and 2 schematically showing an outer appearance thereof, a generally rectangular box-shaped casing 18 having a front surface 20 formed with an operating pad 14 and a display window 16 that are elements necessary for a telephone set generally as is the case with the prior art mobile phone. The casing 18 also has a rear surface 22, one end of which surface 22 is inwardly cut out in a generally L-shaped configuration to define a battery chamber delimited by a mounting surface 24. A battery module 12 while adapted to be replaceably mounted to the casing 18, is accommodated within the battery chamber as shown in FIG. 2 when mounted to the casing 18.

So long as the battery module 12 is accommodated within the battery chamber as shown in FIG. 2, a coupling surface 26 of the battery module 12 is held in tight contact with the mounting surface 24. With the battery module 12 fitted to the casing 18 in this way, the both are so integrated together as to represent a generally rectangular box-like configuration having a peripheral shape of a size comfortable to hold in hand with no step formed therein.

Figure 3:
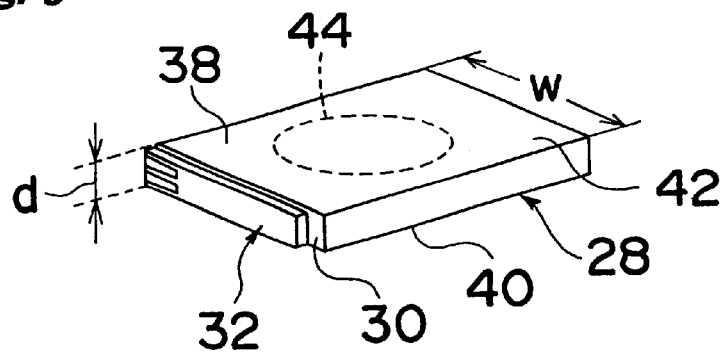
FIG. 3 is a schematic perspective view of a battery forming a part of the battery module shown in FIGS. 1 and 2.

The battery module 12 includes a generally rectangular container 34 made of a synthetic resin, within which a battery 28 of a generally flattened plate-like configuration as shown in FIG. 3 and a protective circuit 32 fitted to a side surface 30 thereof for protecting the battery 28 during charging and discharging are sealed. Interface between an electric circuit of the mobile phone 10 and the battery 28 includes, as is the case with that in the conventional mobile phone, electrodes 36 exposed to the outside through respective openings formed, in the illustrated embodiment, on the coupling surface 26, and mating electrode on the casing 18. Accordingly, so long as the battery module 12 is fitted to the casing 18, the mobile phone 10 is electrically powered by the battery module 12.

The battery 28 is employed in the form of a repeatedly rechargeable lithium ion battery of a flattened configuration having rectangular front and rear surfaces 38 and 40 as shown in FIG. 3, each of the front and rear surfaces 38 and 40 having a width W somewhat smaller than the width of the casing 18 of the mobile phone 10 and also having a thickness d equal to or smaller than 5 mm.

The battery 28 has a shell 42 made of a material having a relatively small specific gravity such as, for example, aluminum and having a wall thickness thereof chosen to be a minimum value permitted within the standard tolerance, so that the battery as a whole can have as small a weight as possible. Even though the size and the weight are reduced in this manner, the side surface 30 of the shell 42 or portions thereof adjacent such side surface 30 can retain the required shape. However, when the internal pressure increases as the battery is charged, respective central regions of the front and rear surfaces 38 and 40 of the battery 28 swell in respective directions opposite to each other as indicated by 44a and 44b in FIG. 6, and protrusion of about 0.3 mm of each central region of the respective battery surface consequent upon swelling is tolerated.

On the other hand, the container 34 is made of a synthetic resin having an electric insulating property and is of a design effective to enclose the battery 28 in tight contact with the circumference of the battery 28 to avoid any possible direct contact from exterior to the battery 28.

The container 34 has a wall thickness equal to or as smaller than 0.6 mm as possible so that the weight and the volume of the battery module as a whole can be reduced. On the other hand, reduction in strength of the container 34 is hence unavoidable. However, the both are jointed by allowing a portion of a high rigidity and relatively less susceptible to deformation such as the side surface 30 and a portion adjacent thereto of the battery 28 to be bonded together with an inner surface of the container 34 and, at the same time, the outer surface of the battery 28 and the inner surface of the container 34 are held in contact with each other as tightly as possible, so that the strength of the battery module as a whole can be maintained by the utilization of the rigidity of the battery 28 while deformation of the container 34 itself is tolerated.

In addition to the structural design described above, according to the present invention, arrangement has been made to guide deformation of the built-in battery 28 towards a periphery of the mobile phone 10 while deformation at a location where the battery module 12 contacts the mobile phone 10 is avoided.

To accomplish this characteristic arrangement, at least one of three major components including the battery 28, forming a part of the battery module 12, the container 34 also forming another part of the battery module 12, and a joint retaining member 46, as will be described later, for retaining a contact between the both, is so shaped and so configured as follows.

Figure 4:
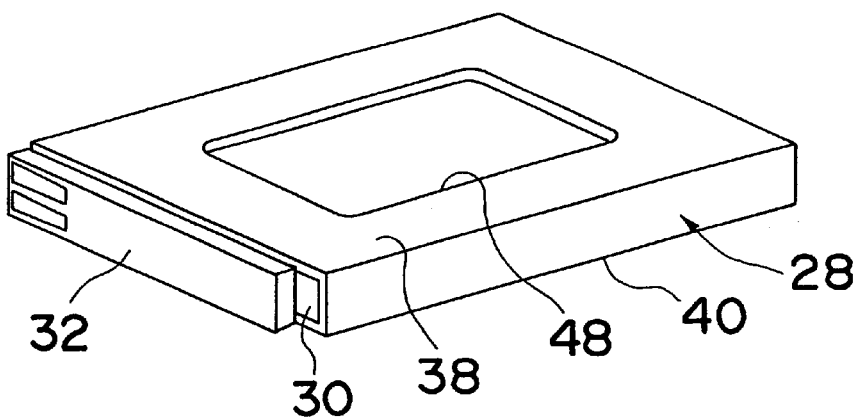
FIG. 4 is a schematic perspective view showing the battery module designed according to a preferred embodiment of the present invention.
Figure 5:
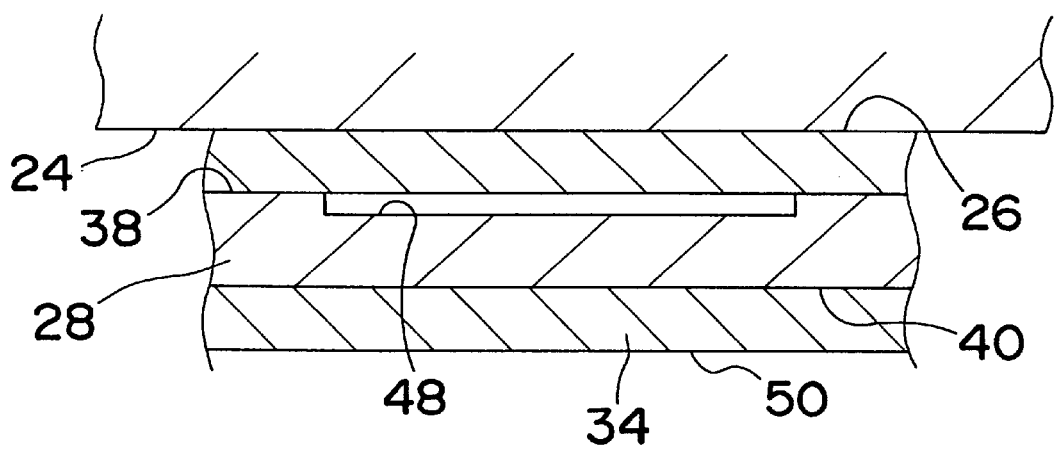
FIG. 5 is a fragmentary side sectional view of the battery module shown in FIG. 4.
Figure 6:
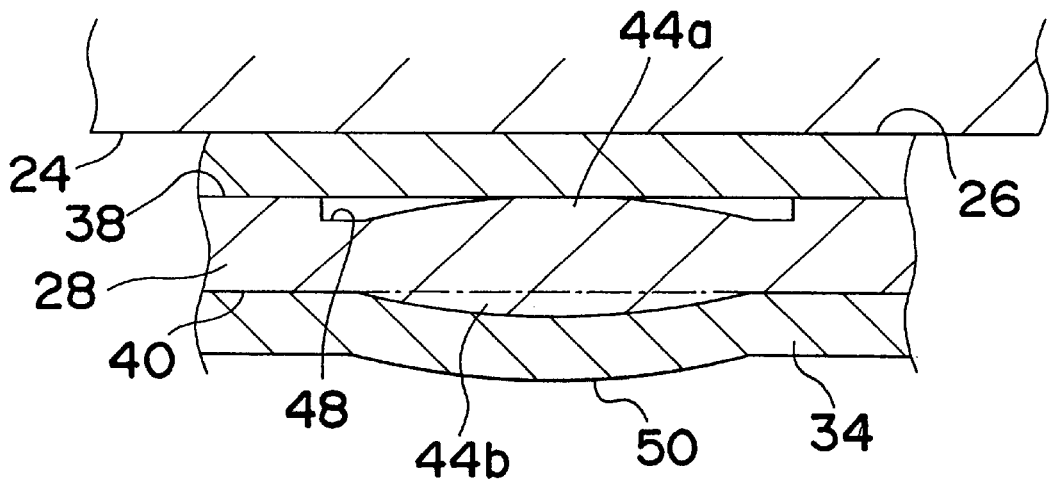
FIG. 6 is an explanatory diagram showing the manner in which deformation of the battery module shown in FIGS. 4 and 5 is absorbed.

In the first place, in the battery 28, any possible protrusion of a center region of the battery module 12 in a direction facing the mounting surface 24 of the casing 18 as a result of swelling of the front surface 38 of the shell 42 is prevented. As one method to accomplish this, during manufacture, a recess 48, for example, is preformed at a center region of the front surface 38 at which deformation in the shell 42 should be prevented, as shown in FIGS. 4 and 5. Accordingly, even though a swelled portion 44 (portions 44a and 44b as shown in FIG. 6) is formed on, the center region of each of the front and rear surfaces 38 and 40 as a result of increase of the internal pressure in the shell 42, the swelled portion 44a protruding towards the mounting surface 24 of the mobile phone 10 can be accommodated within the recess 48, thereby preventing a center region of the coupling surface 26 of the container 34 from protruding. On the other hand, an outer surface 50 of the container 34 opposite to the coupling surface 26 of the container 34 has its center region tolerated to deform in correspondence with the swelling at 44b.

Alternatively, or in combination therewith, the front surface of the shell 42 may have a thickness greater than that of the rear surface 40 to thereby have an increased rigidity, in which case even when the internal pressure inside the shell 42 increases, any influence brought about by the increased internal pressure can be centered on the rear surface 40 having a relatively low rigidity to thereby prevent the coupling surface 26 with the mobile phone 10 from being deformed.

Figure 7:
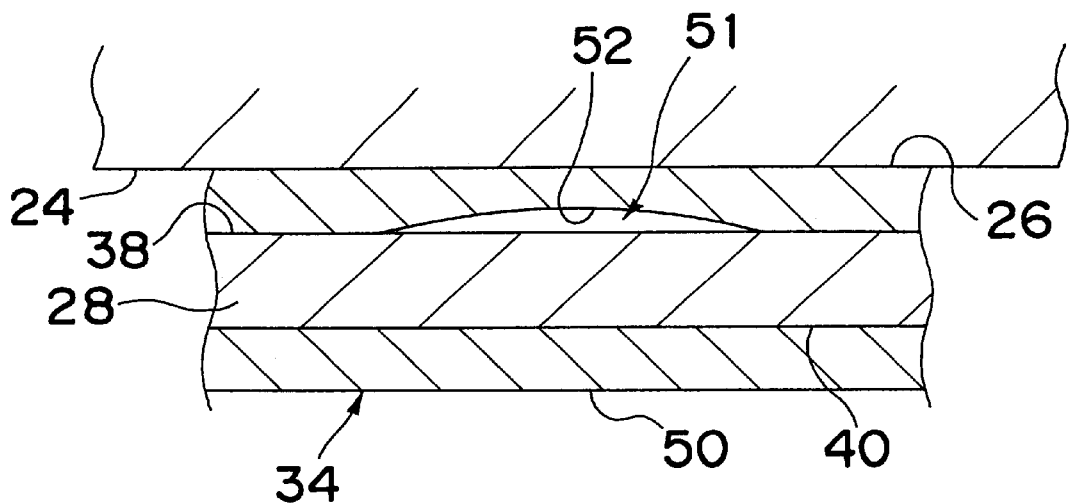
FIG. 7 is a fragmentary side sectional view of the battery module according to another preferred embodiment of the present invention.
Figure 8:
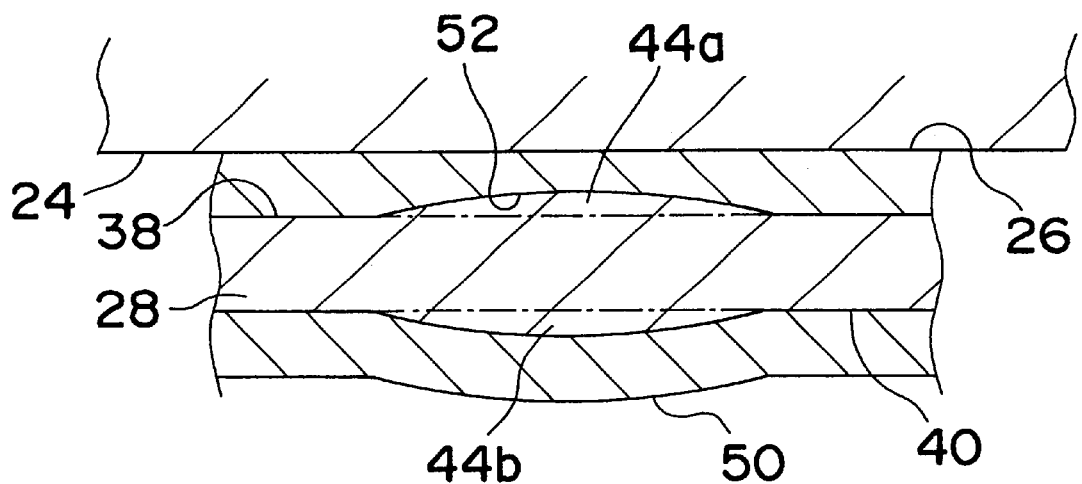
FIG. 8 is an explanatory diagram showing the manner in which deformation of the battery module shown in FIG. 7 is absorbed.
Figure 9:
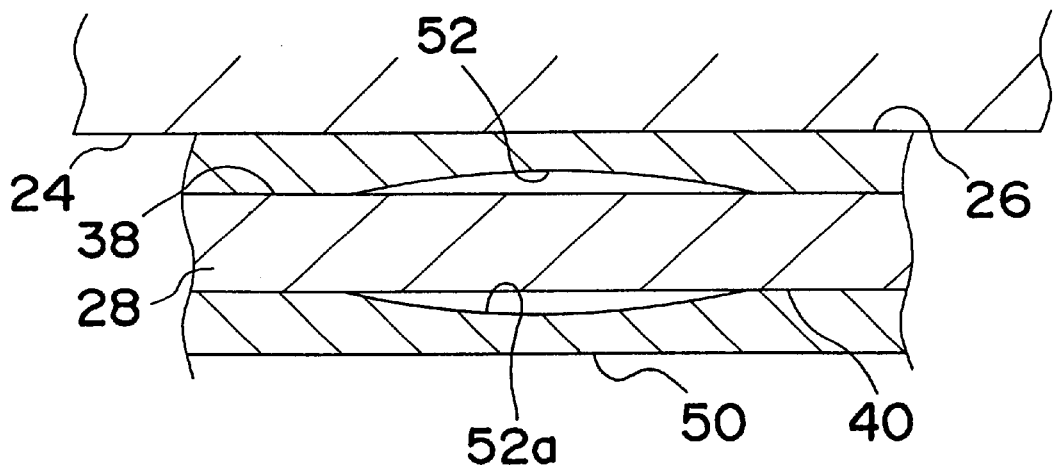
FIG. 9 is a fragmentary side sectional view, showing a modification of the embodiment shown in FIG. 7.

In an alternative embodiment of the present invention shown in FIGS. 7 and 8, a recess 52 is formed in an inner surface of the container 34 confronting the front surface 38 of the battery 28 to form a gap 51 for accommodating the swelling 44a of the battery 28 resulting from deformation of the battery 28. This recess 52 is defined at such a location where it confronts only in a direction of contact of the container 34 with the mobile phone 10. However, as shown in FIG. 9, the opposite surface of the container 34 confronting the rear surface 40 of the container 34 may have a similar recess 52a formed therein to accommodate expansion of the battery 28.

The recess 52 may be formed of any suitable shape at any suitable location, provided that it is effective to accommodate the swelling of the battery 28, but if it is formed of a shape occupying a portion of the sphere, it can be easily formed by the use of an injection molding technique with a strength of a peripheral edge of the recess 52 maintained.

A third preferred embodiment of the present invention is shown in FIGS. 10 to 13. In this embodiment, the joint retaining member 46 is employed between the battery 28 and the container 34. This joint retaining member 46 may be employed in the form of an oblong piece of a double-sided adhesive tape or an adhesive material having a negligible thickness. In the practice of the present invention, however, the joint retaining member 46 is employed in the form of an oblong piece of a double-sided adhesive tape of a thickness, for example, 0.3 mm, corresponding to the possible amount of protrusion of the swelling 44a that takes place in the shell 24, as shown in FIGS. 10 to 13.

Figure 10:
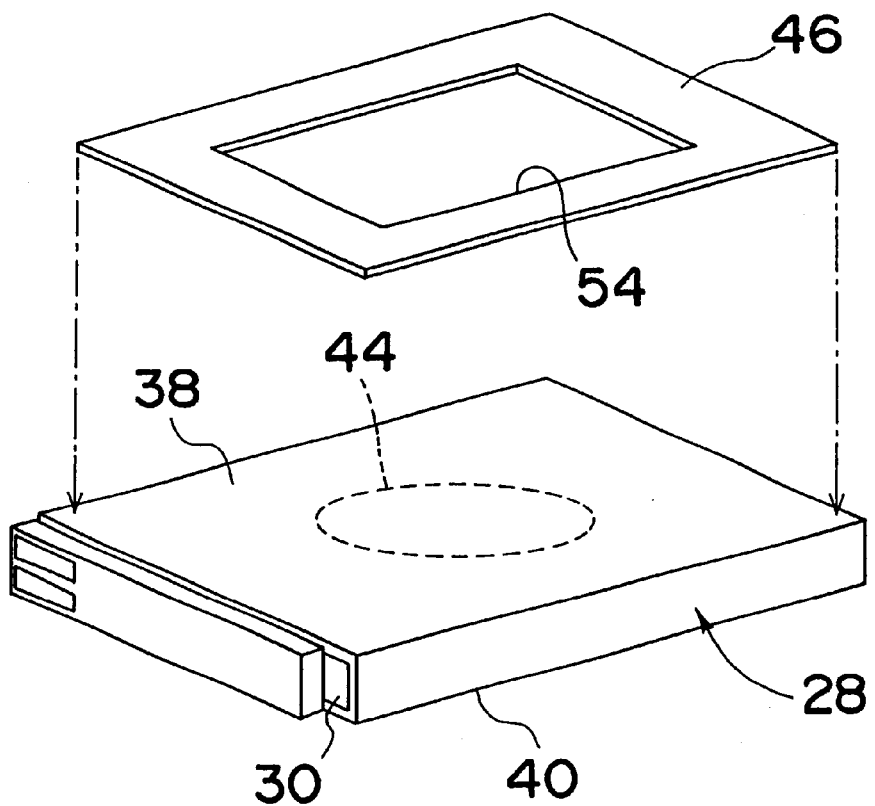
FIG. 10 is a schematic exploded view of the packaged battery pack according to a third preferred embodiment of the present invention.
Figure 11:
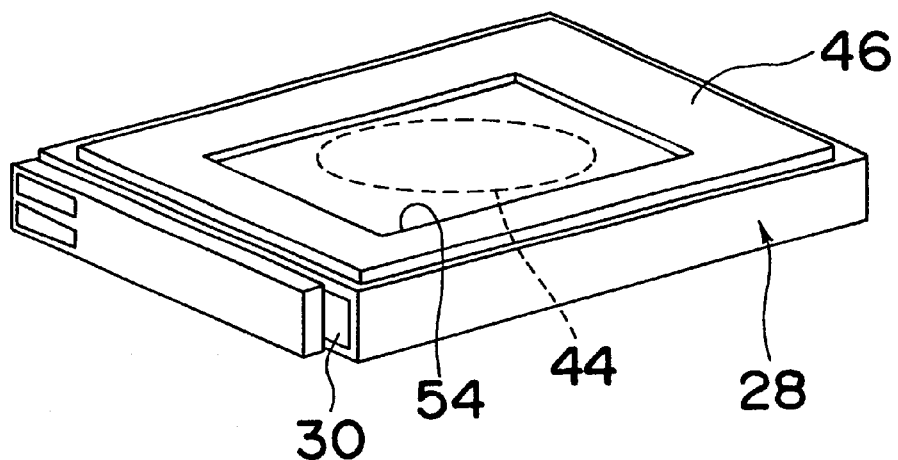
FIG. 11 is a schematic perspective view of the battery module shown in FIG. 10.
Figure 12:
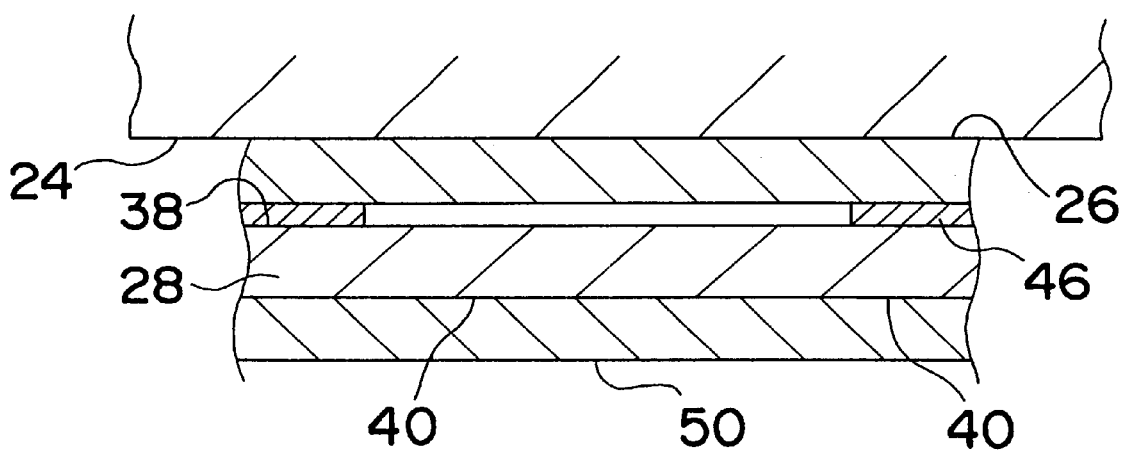
FIG. 12 is a fragmentary side sectional view of the battery module shown in FIG. 11.
Figure 13:
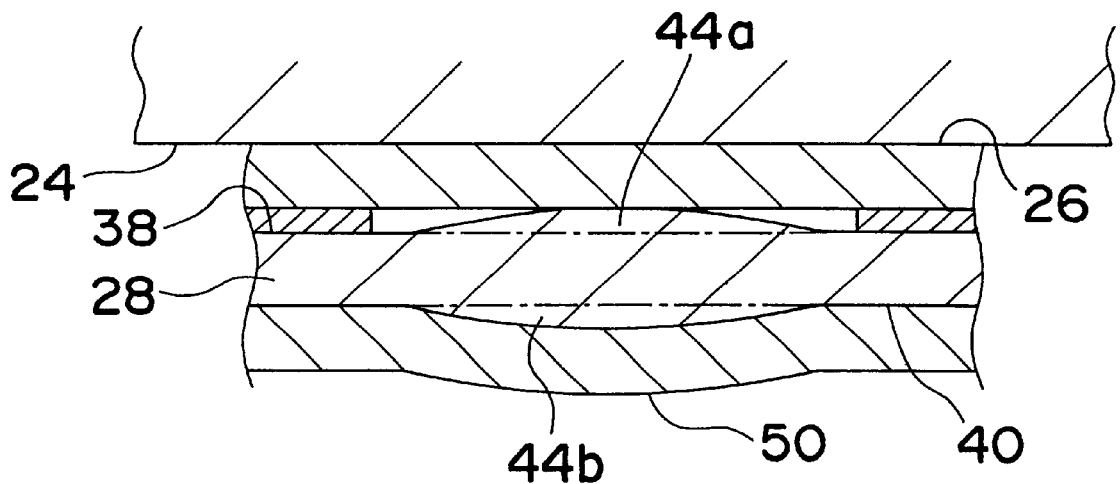
FIG. 13 is an explanatory diagram showing the manner in which deformation of the battery module shown in FIG. 11 is absorbed.

The joint retaining member 46 may be of a sheet-like shape having a rectangular opening 54 defined at a center portion thereof, leaving a rectangular peripheral band bonded to a correspondingly shaped peripheral portion of the front surface 38 of the shell 42 as shown in FIGS. 10 and 11, wherefore the swelling 44a of the battery 28 can be accommodated within the opening 54 to thereby prevent the container 34 from being deformed.

Although the present invention has been described in connection with the preferred embodiments thereof with reference to the accompanying drawings, it is to be noted that various changes and modifications are apparent to those skilled in the art. For example, in any of the foregoing embodiments the casing 18 have one end portion cut out to define the battery chamber with the battery module 12 replaceably accommodated within such battery chamber. However, the position at which the battery module is mounted is not always limited to that shown and described, but the battery chamber may be defined by cutting out an intermediate or center portion of the casing 18, or the battery module may be of a design capable of being inserted in an upper or lower end of the casing 18.

Also, the battery 28 accommodated within the container 34 may not be always limited to a lithium ion battery utilizing the aluminum shell, but the type and the outer appearance of the battery as well as the material for the shell 42 may be suitably chosen as desired. In addition, the outer shape and the dimensions of the battery module as a whole may be varied to fit to the compact electric appliance with which it is used.

Accordingly, such changes and modifications are to be understood as included within the scope of the present invention as defined by the appended claims, unless they depart therefrom.

What is claimed is:

1. A battery module adapted to be replaceably mounted on a compact electric appliance and capable of forming a part of an outer peripheral surface of the compact electric appliance, said module comprising:

a battery, said battery having a thickness and an outer flattened shape, said battery being deformable in a thickness direction thereof;

a container, said container tightly enclosing said battery; and means operable when mounted on the compact electric appliance, to allow deformation of the battery in a direction away from the compact electric appliance to be transferred to the container, but to prevent deformation of the battery in a direction toward the compact electric appliance to be transferred to the compact electric appliance.

2. The battery module as defined in claim 1, wherein deformation of the battery toward the compact electric appliance is suppressed.

3. The battery module as defined in claim 2, wherein the deformation is suppressed by providing a rigidity of a second surface of the container set to a value lower than that of a first surface of the container.

4. The battery module as defined in claim 2, wherein the deformation is suppressed by providing a recess at a center region of a first surface of the container.

5. The battery module as defined in claim 3, wherein the first surface of the container which confronts a surface of the battery is preformed with a recess of a size corresponding to a swelling of the battery.

6. The battery module as defined in claim 1, wherein the container retains a peripheral edge portion of the battery and is provided with a gap defined in a surface thereof that contacts the battery in a direction of the thickness, said gap being operable to prevent deformation of the battery from being transferred to the container.

7. The battery module as defined in claim 6, wherein the gap provided inside the container is a recess defined at a center region of a surface thereof that confronts the battery, said recess having a size corresponding to a swelling of the battery.

8. The battery module as defined in claim 6, wherein the gap provided inside the container is defined by a thickness of a retaining member for joining a periphery of the battery to an inner surface of the container.

9. The battery module as defined in claim 3, wherein the first surface of the container which confronts a surface of the battery is preformed with a recess of a size corresponding to a swelling of the battery.

* * * * *